United States Patent Office 3,128,376
Patented Apr. 7, 1964

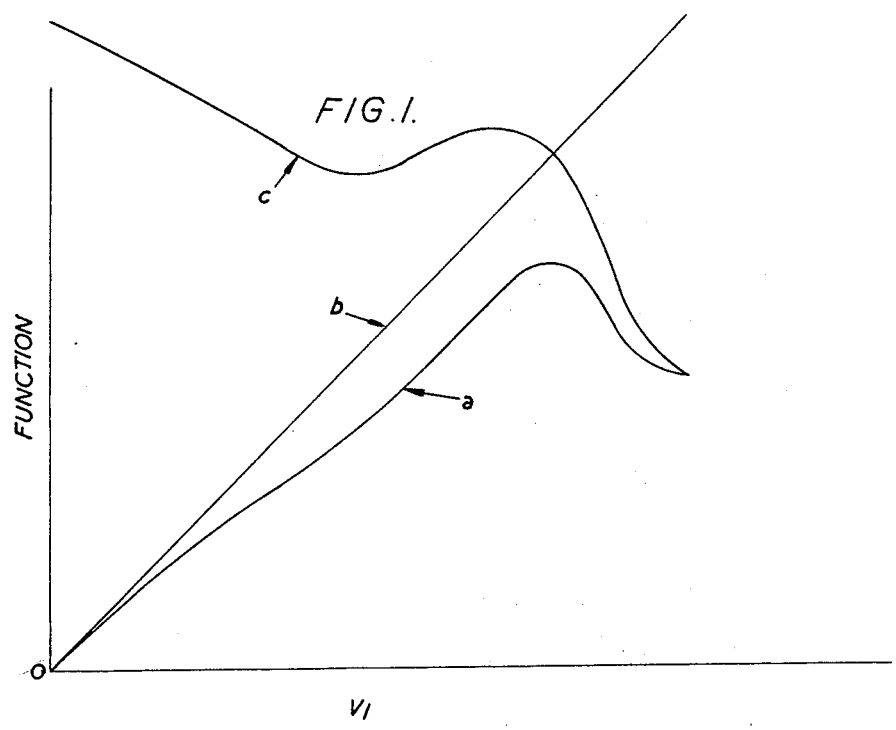
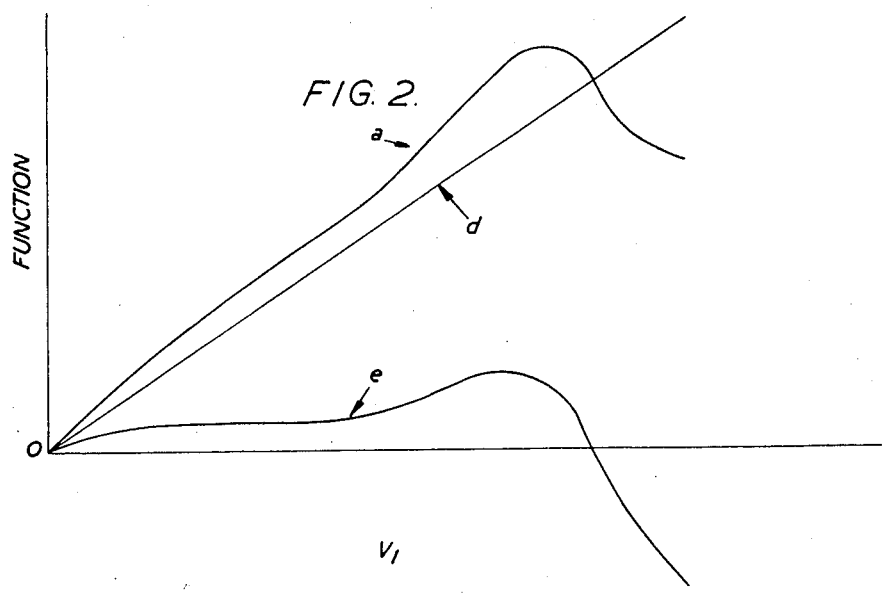

3,128,376
NON-LINEAR FUNCTION GENERATOR
Ernest Edward Barber, South Harrow, and Kenneth Henry Simpkin, Aylesbury, England, assignors to General Precision Systems Limited, a corporation of Great Britain
Filed Dec. 6, 1954, Ser. No. 473,349
Claims priority, application Great Britain Dec. 4, 1953
8 Claims. (Cl. 235—197)

This invention relates to analogue computers.

For providing, in such computers, a voltage proportional to a non-linear function of a variable voltage, it is usual to use voltage dividing means comprising a shaped potentiometer the slider of which is automatically positioned in accordance with the variable voltage by an electromechanical positional servo. The disadvantage of such means is that the servo is not immediately responsive to changes in the variable and the resultant voltage therefore does not accurately represent the transient value of the quantity being computed. There is always a lag between the instant of change in the value of the variable and the production of the desired voltage. The lag is measured in milliseconds but can appreciably impair the performance of a computer.

In the case of linear functions and certain simple non-linear functions the required voltage can be produced without the interposition of mechanical motion and so with a lag is measured in microseconds and which is acceptable. Complex functions, however, cannot be so derived, or at least only by the introduction of unacceptable complications.

The invention is an application of the principle that a complex function can be expressed as a modification of a more simple function.

According to the invention, the value of a desired non-linear function of a variable is continuously computed by the production, by static means of a basic output voltage representing the value of a relatively simple function of the variable and the correction of that voltage by the appropriate further function of the variable which is produced electromechanically.

By "static" means is meant means in which there is no mechanical mass which has to be accelerated when the variable changes, and no other lag-producing characteristic such as a thermal capacity which has to be satisfied before there can be any effective response. A thermionic amplifier is an example of such static means; a potential divider comprising a potentiometer having a fixed tap is another example; a transformer is yet another example. An electromechanical servo having a slider which is moved under the influence of change of a variable, however, is not static because of the inertia of the slider and other moving parts. Thus the electromechanical servo may be defined as "dynamic" means. Nor is an electrically heated thermocouple "static" in the sense in which the term is used here because there must necessarily be a delay in its response to variation of the input as a result of its thermal capacity.

The basic voltage, being produced without involving the acceleration of mechanism, will vary simultaneously with variation of the variable. The correction by the dynamic means, being made electromechanically, will be subject to the time delay inherent in the mechanism and will, accordingly, not be wholly accurate during changes. The error will, however, be smaller than that which would result from the wholly electromechanical evaluation of the complex function because the effect of the delay is felt only by the adjusting factor. By the choice of conditions giving rise to a basic voltage which fairly closely represents the complex function, the error can be reduced to very small proportions indeed.

In order that the invention may be thoroughly understood it will be further explained with reference to the accompanying drawings in which:

FIGS. 1 and 2 show examples of curves of complex functions which can be expressed as a modification of a more simple function.

The non-linear function represented by the curve $a$ in FIGURE 1 can be expressed as the product of the linear function represented by the line $b$ and the non-linear function represented by the line $c$. The same non-linear function $a$ could equally well be expressed (FIGURE 2) as the algebraic sum of a linear function $d$ and a non-linear function $e$. It is possible (especially by the use of thermionic equipment) to obtain parabolic and other simple non-linear functions of a variable voltage, and in appropriate cases such functions may be so produced to give a closer first approximation than the linear functions such as $b$ and $d$.

Figure 3:
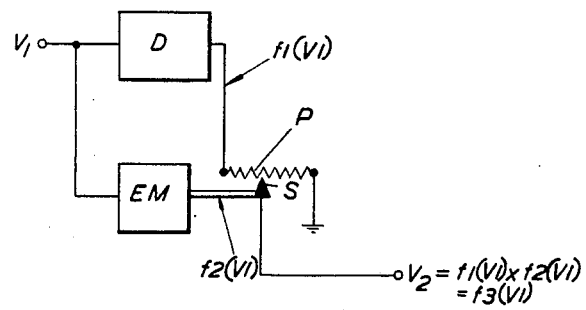
FIGS. 3 and 4 show diagrammatic arrangements in accordance with the invention for evaluating the functions shown in FIGS. 1 and 2.

FIGURE 3 shows diagrammatically an arrangement for solving the equation:

$$V_2 = f_3(V_1) = f_1(V_1) \cdot f_2(V_1)$$

in which $V_1$ is a variable;
$f_3$ is a complex function (for example function $a$ of FIGURES 1 and 2) of the variable;
$f_1$ is a simple function of the variable capable of being evaluated by static means in a simple manner; and
$f_2$ is an adjusting function capable of being evaluated electromechanically.

In FIGURE 3 D is a static device (for example a fixed voltage divider, transformer, or thermionic amplifier) responding to the variable $V_1$ to produce the basic voltage $f_1(V_1)$—for example the linear function $b$ of FIGURE 1—which is applied to a potentiometer P.

EM is an electromechanical positional servo which also receives the input $V_1$ and serves to position the slider S of the potentiometer in accordance with $V_1$. EM may be a conventional electromechanical positional servomotor, of a type well known in the computer art. Such servomechanisms are disclosed in Korn and Korn, "Electric Analog Computers," page 15, published by McGraw-Hill Book Company in 1952.

The potentiometer winding is graded in depth in accordance with the function $f_2$ (for example function $c$ in FIGURE 1) so that the voltage $V_2$ which is tapped off through the slider is proportional to the product of $f_1(V_1)$ and $f_2(V_1)$. This is accomplished by employing a non-linear potentiometer winding P, which may be tapered or contoured in a manner well known to the computer art, whereby the resistance of the potentiometer winding P may be made to follow any desired function curve. A contoured potentiometer is disclosed in United States Patent No. 2,404,387 to Lovell, while a tapered potentiometer is disclosed in Darlington Patent No. 2,468,179.

The voltage across the potentiometer P will vary simultaneously with variations in $V_1$. The position of the slider S will also vary with variations in $V_1$ but only after the delay inherent in the mechanism of the servo EM. The resultant voltage $V_2$ will, therefore, not be quite accurate in transient conditions but it will at least change simultaneously with change in the variable $V_1$ and to approximately the right degree. In other words, immediate response of the resultant voltage is ensured and the error arising out of the delay in response of the servo is minimised.

Figure 4:
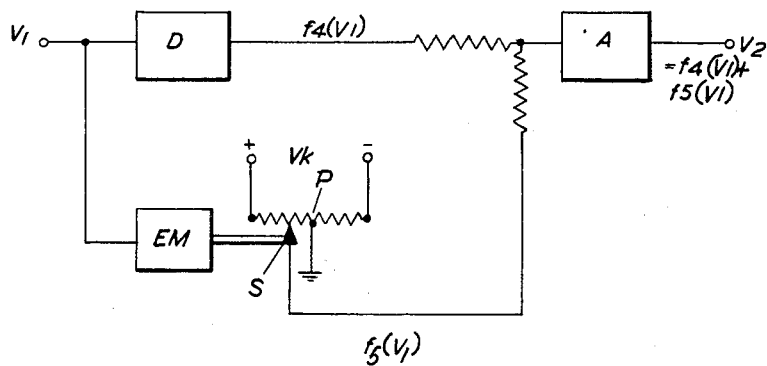

FIGURE 4 shows an arrangement for solving the equation:

$$V_2 = f_3(V_1) = f_4(V_1) + f_5(V_1)$$

$f_3$ being, for example, again the curve $a$ of FIGURES 1 and 2, and $f_4$ and $f_5$ being respectively the curves $d$ and $e$ of FIGURE 2.

D and EM correspond to the devices D and EM in FIGURE 3. The output $f_4(V_1)$ of the static device D, however, is fed to an electronic summing amplifier A.

The servo EM again serves to position the slider S of the potentiometer P but the latter receives in this case a constant voltage $V_k$ and is so wound that the voltage tapped off from the slider is of such a positive or negative magnitude as is required, according to the value of $V_1$, to be added to or subtracted from the output of the device D to produce the desired resultant voltage. In other words, the potentiometer is wound in accordance with $f_5$.

The output of the potentiometer, i.e. $f_5(V_1)$, is fed to the summing amplifier A the output of which is therefore $$f_4(V_1) + f_5(V_1) = V_2$$

As in the case of FIGURE 3, $V_2$ will vary simultaneously with variation of $V_1$ and the delay inherent in the servo EM will be felt only in the evaluation of the adjusting factor $f_5(V_1)$.

As previously stated, the device D could be such as to produce a non-linear function if required in the interests of close approximation, but such function will, of course, always be less complex or more regular than the function which is finally to be computed.

We claim:

1. An analogue computer for evaluating the instantaneous value of a non-linear time-independent complex function of an input variable comprising, static means for connection to an input voltage and adapted to produce a basic output voltage representing a simple time-independent function of said variable, in combination with dynamic means adapted to be driven by said input voltage and to operate upon said basic output voltage in accordance with a further and different time-independent function to modify said basic output voltage and produce a resultant voltage representing the complex function.

2. An analogue computer for evaluating the instantaneous value of a non-linear time-independent complex function of an input variable comprising amplifying means adapted for connection to a variable input voltage which varies in accordance with said input variable for producing a basic output voltage representing a simple time-independent function of said input variable, an electromechanical servomechanism connected to the input of said amplifier and adapted to be positioned in accordance with said variable input voltage, a variable potentiometer contoured according to a second function and driven by said servomechanism to produce a voltage variance corresponding to said second function, and means for combining the potential outputs of said amplifier and said variable potentiometer to produce a resultant voltage representing the complex function.

3. Apparatus according to claim 1 in which said static means includes an electronic amplifier circuit and in which said dynamic means comprises a servo-driven potentiometer.

4. Apparatus according to claim 2 in which said means for combining the potential outputs comprises a voltage summing circuit.

5. Apparatus according to claim 2 in which said means for combining the potential outputs comprises means responsive to said basic output voltage and said voltage variance and operative to provide an output potential commensurate with the product of said basic output voltage and said voltage variance.

6. An analogue computer for evaluating the instantaneous value of a desired non-linear time-independent complex function of an input variable, comprising in combination, static means connected to a variable input voltage to produce a basic output voltage which is a simple function of said variable and an approximation of said desired function of said variable, said variable input voltage varying in accordance with said input variable, electromechanical means adapted to be driven by said input voltage to produce an output variance voltage representing a further and different time-independent function of said variable, and means for modifying said basic voltage by said variance voltage to produce a final voltage representing said non-linear time-independent complex function of said input variable.

7. An electromechanical system for generating an output voltage which varies according to a desired non-linear complex function of an input variable voltage, comprising in combination; a potentiometer having a movable pick-off element; electromechanical means responsive to said input voltage to adjust, in accordance with a linear relationship to said input voltage, said movable pick-off element of said potentiometer; said potentiometer being provided with a non-linear characteristic conforming with the variance between said input voltage and said complex function of said input voltage, said potentiometer being connected to be excited by a voltage varying in accordance with a linear function of said input variable, and said variance equalling the factor by which successive values of said variable must be multiplied to yield the complex function thereof at said pick-off element.

8. An electromechanical system for generating an output voltage which varies according to a desired non-linear complex function of an input variable voltage, comprising in combination; a potentiometer having a movable pick-off element; electromechanical means responsive to said input voltage to adjust, in accordance with a linear relationship to said input voltage, said movable pick-off element of said potentiometer; said potentiometer being provided with a non-linear characteristic conforming with the variance between said input voltage and said complex function of said input voltage, said potentiometer being connected to be excited by a constant voltage, and variance being the function which expresses the difference between said variable and the complex function thereof; and amplifier means for adding said input voltage and a voltage commensurate with said variance for providing said output voltage.

References Cited in the file of this patent

UNITED STATES PATENTS

| 2,114,330 | Borden | Apr. 19, 1938 |
| 2,468,179 | Darlington et al. | Apr. 26, 1949 |
| 2,671,610 | Sweer | Mar. 9, 1954 |
| 2,793,335 | Woodruff | May 21, 1957 |
| 2,831,107 | Raymond et al. | Apr. 15, 1958 |

OTHER REFERENCES

Electronic Analog Computers (Korn and Korn), published by McGraw-Hill Book Co., New York, 1952, FIG. 2.11(c), page 51 relied on. (Copy in Scientific Library and in Div. 23.)

Electric Analog Computers (Korn and Korn), published by McGraw-Hill Book Co., New York, 1952, page 30. Copy in Div. 23.

Servo Systems for Performing Mathematical Operations (Wall), Product Engineering, September 1953, page 139.

Soroka: Analog Methods in Computation and Simulation, McGraw-Hill Book Co., Inc., New York (1954); copy in Div. 23; page 157 relied on.